(12) United States Patent
Filsfils et al.

(10) Patent No.: US 11,050,662 B2
(45) Date of Patent: Jun. 29, 2021

(54) MALLEABLE ROUTING FOR DATA PACKETS

(71) Applicant: Cisco Technology, Inc., San Jose, CA (US)

(72) Inventors: Clarence Filsfils, Brussels (BE); Peter Psenak, Bratislava (SK); Francois Clad, Strasbourg (FR); Jose Antonio Liste, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/986,174

(22) Filed: May 22, 2018

(65) Prior Publication Data

US 2019/0007305 A1    Jan. 3, 2019

Related U.S. Application Data

(60) Provisional application No. 62/527,611, filed on Jun. 30, 2017.

(51) Int. Cl.
*H04L 12/725* (2013.01)
*H04L 12/24* (2006.01)
(Continued)

(52) U.S. Cl.
CPC ........ *H04L 45/306* (2013.01); *H04L 41/0813* (2013.01); *H04L 45/123* (2013.01);
(Continued)

(58) Field of Classification Search
CPC ......... H04L 45/38; H04L 45/02; H04L 45/42; H04L 47/2483; H04L 47/125; H04L 47/10
See application file for complete search history.

(56) References Cited

U.S. PATENT DOCUMENTS 9,537,769 B2    1/2017  Bryant et al.
9,559,985 B1 *  1/2017  Ye ....................... H04L 49/1515
(Continued)

OTHER PUBLICATIONS

Pierre Francois et al., "Avoiding transient Loops during IGP Convergence in IP Networks", Dept CSE, Universite Catholique de Louvain (UCL), Belgium, pp. 1-11.
(Continued)

*Primary Examiner* — Romani Ohri
(74) *Attorney, Agent, or Firm* — Merchant & Gould P.C.

(57) ABSTRACT

Various implementations disclosed herein enable malleable routing for data packets. For example, in various implementations, a method of routing a type of data packets is performed by a device. In some implementations, the device includes a non-transitory memory and one or more processors coupled with the non-transitory memory. In some implementations, the method includes determining a routing criterion to transmit a set of data packets across a network. In some implementations, the method includes identifying network nodes and communication links in the network that satisfy the routing criterion. In some implementations, the method includes determining a route for the set of data packets through the network nodes and the communication links that satisfy the routing criterion. In some implementations, the method includes configuring the network nodes that are on the route with configuration information that allows the set of data packets to propagate along the route.

20 Claims, 9 Drawing Sheets

(51) Int. Cl.
*H04L 12/723* (2013.01)
*H04L 12/721* (2013.01)
*H04L 12/717* (2013.01)

(52) U.S. Cl.
CPC .............. *H04L 45/42* (2013.01); *H04L 45/44* (2013.01); *H04L 45/50* (2013.01); H04L 45/12 (2013.01)

(56) References Cited

U.S. PATENT DOCUMENTS

| | | | |
|---|---|---|---|
| 2015/0026313 A1* | 1/2015 | Chawla | H04L 47/24 709/220 |
| 2017/0171066 A1* | 6/2017 | Hao | H04L 45/125 |
| 2017/0230274 A1 | 8/2017 | Filsfils et al. | |
| 2017/0230276 A1* | 8/2017 | Ceccarelli | H04L 45/64 |
| 2017/0250908 A1* | 8/2017 | Nainar | H04L 45/64 |
| 2018/0077068 A1* | 3/2018 | Dhanabalan | H04L 47/2433 |
| 2018/0167458 A1* | 6/2018 | Ould-Brahim | H04L 67/1065 |

OTHER PUBLICATIONS

Adrian Reuter, "Source Packet Routing in Networking (SPRING)", Seminars FI/IITM WS 16/17, Network Architectures and Services, May 2017, doi:10.2313/NET-2017-05-01_05, pp. 31-37.

* cited by examiner

MALLEABLE ROUTING FOR DATA PACKETS

PRIORITY CLAIM

This application claims priority to U.S. provisional patent application No. 62/527,611 filed on Jun. 30, 2017, the contents of which are hereby incorporated by reference.

TECHNICAL FIELD

The present disclosure relates generally to routing, and in particular, to malleable routing for data packets.

BACKGROUND

In some previously available networks, data packets are routed based on a fixed rule that aims to optimize a specific metric. For example, in some previously available networks, data packets are routed based on a shortest path algorithm. However, fixed rules are sometimes unsuitable for certain types of data packets. For example, not all data packets need to be routed based on the shortest path algorithm. As an example, some data packets may need to be routed via network nodes that support a heightened level of encryption even if such network nodes are not on the shortest path.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
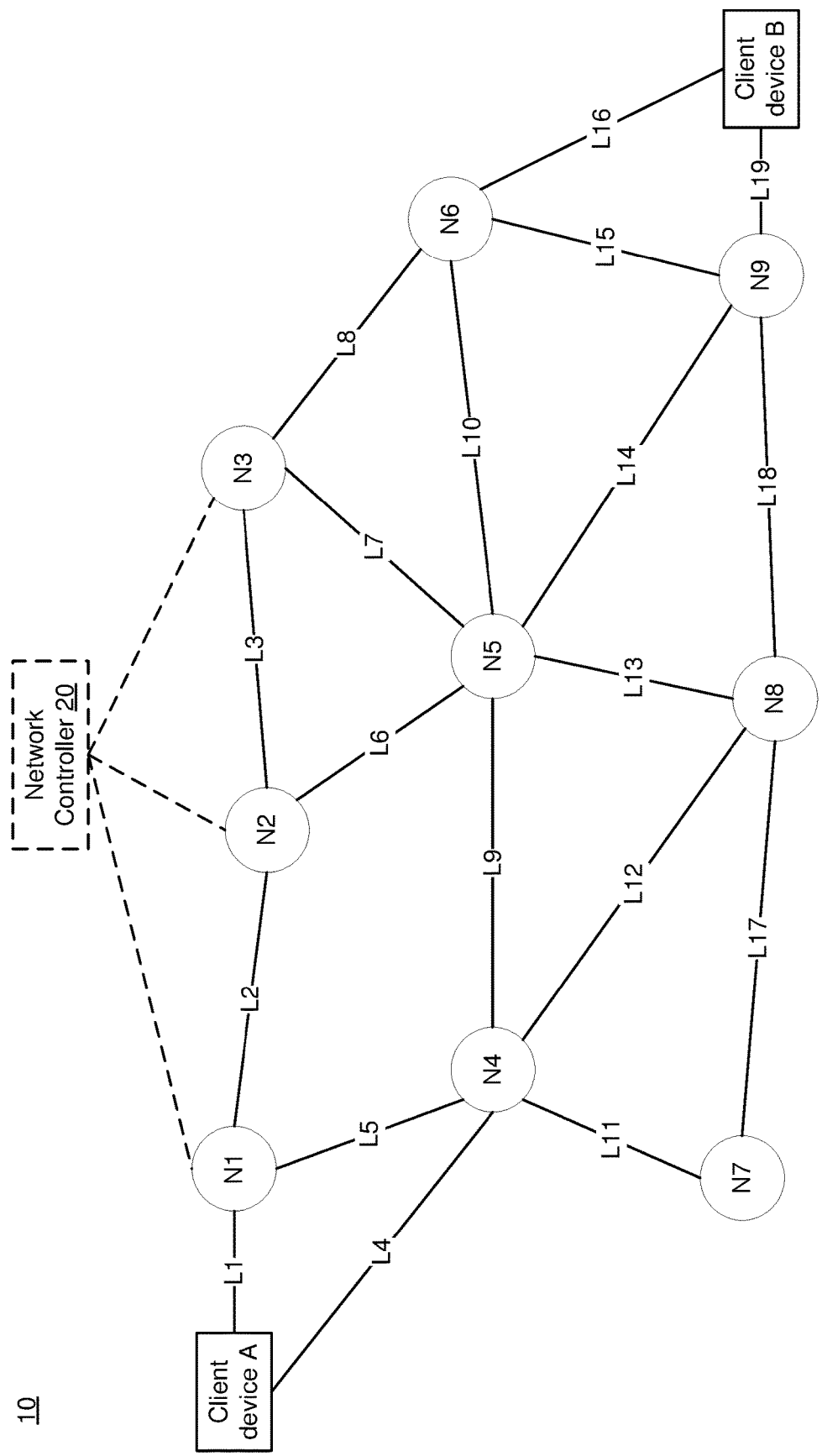
FIGS. 1A-1F are schematic diagrams of a network environment that allows malleable routing for data packets in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein enable malleable routing for data packets. For example, in various implementations, a method of routing a type of data packets is performed by a device. In some implementations, the device includes a non-transitory memory and one or more processors coupled with the non-transitory memory. In some implementations, the method includes determining a routing criterion to transmit a set of data packets across a network. In some implementations, the method includes identifying network nodes and communication links in the network that satisfy the routing criterion. In some implementations, the method includes determining a route for the set of data packets through the network nodes and the communication links that satisfy the routing criterion. In some implementations, the method includes configuring the network nodes that are on the route with configuration information that allows the set of data packets to propagate along the route.

Example Embodiments

Some networks treat various types of data packets equally. For example, some networks route different types of data packets according to the same routing criterion (e.g., routing algorithm). Many networks primarily utilize a shortest route criterion (e.g., the shortest path algorithm) to route data packets. In such networks, data packets corresponding to a video download are routed according to the same criterion as data packets corresponding to a phone call. This rigid approach of routing data packets according to a fixed criterion is sometimes unsuitable for certain types of data packets. For example, while the shortest route criterion may be suitable for data packets corresponding to a phone call, the shortest route criterion may be unsuitable for data packets corresponding to an encrypted file transfer.

The present disclosure provides methods, systems and/or devices that enable malleable routing for data packets. In some implementations, different routing criteria are utilized to transport different types of data packets. In some implementations, different routing criteria include different routing algorithms or different routing schemes. This flexible approach of utilizing different routing criteria for different types of data packets tends to result in routes that are more suitable for the type of data packets. For example, in some implementations, the shortest route criterion is utilized to route data packets corresponding to a phone call but a different routing criterion is utilized to route data packets corresponding to an encrypted file transfer. The present disclosure provides more configuration options to network operators by allowing the network operators to support different routing criteria. For example, the present disclosure enables a network operator to support an existing routing criterion, support a modified version of an existing routing criterion, and/or create a new routing criterion. The present disclosure also provides more configuration options for individual network nodes. For example, the present disclosure enables a network node to install configuration information for an existing routing criterion, a modified version of an existing routing criterion, and/or a new routing criterion.

FIGS. 1A-1F are schematic diagrams of a network environment 10 that allows malleable routing for data packets in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, the network environment 10 includes client devices A and B, various network nodes N1, N2 . . . N9, various communication links L1, L2 . . . L19, and a network controller 20. Although the network controller 20 is shown as being separate from the network nodes N1, N2 . . . N9, in some implementations, the network controller 20 is implemented by one or more of the network nodes N1, N2 . . . N9. In other words, in some implementations, the network controller 20 is distributed across one or more of the network nodes N1, N2 . . . N9.

Figure 1B:
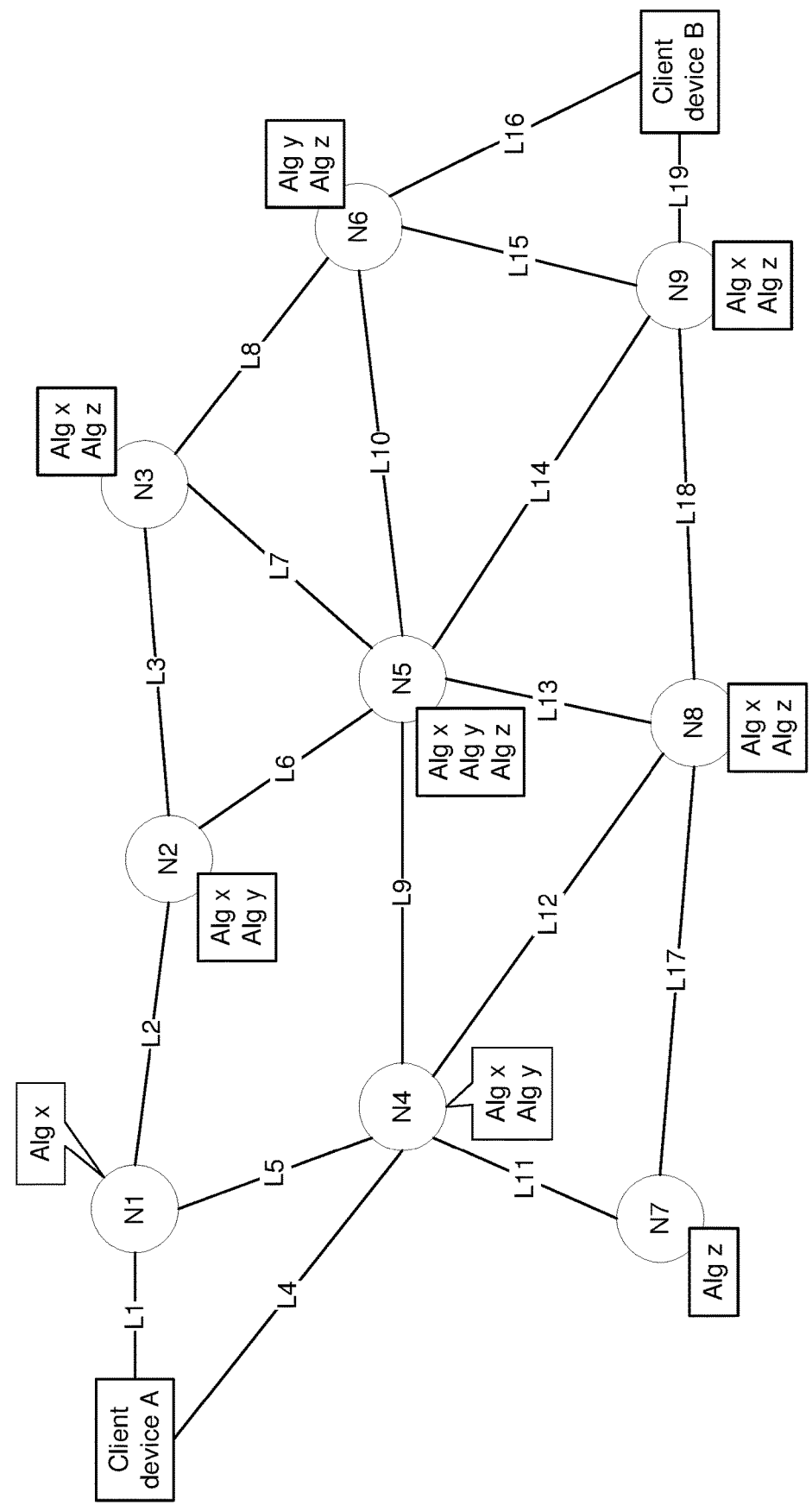

Referring to FIG. 1B, in various implementations, the network nodes N1 . . . N9 support one or more routing criteria. For example, in some implementations, the network nodes N1 . . . N9 support one or more routing algorithms. In the example of FIG. 1B, the network node N1 supports algorithm (Alg) x, the network node N2 supports Alg.s x and y, the network node N3 supports Alg.s x and z, the network node N4 supports Alg.s x and y, the network node N5 supports Alg.s x, y and z, the network node N6 supports Alg.s y and z, the network node N7 supports Alg z, the network node N8 support Alg.s x and z, the network node N9 supports Alg.s x and z. In some implementations, the network nodes N1 . . . N9 are configured to route data packets in accordance with the routing criteria (e.g., the routing algorithm) that the network nodes N1 . . . N9 support. For example, the network node N1 is configured to route data packets in accordance with Alg x.

In some implementations, data packets that are to be routed in accordance with a particular routing criterion are propagated along a route that includes network nodes that support that particular routing criterion. In the example of FIG. 1B, data packets that are to be routed in accordance with Alg x may be transmitted along a route that includes network node N1 or network node N4. However, data packets that are to be routed in accordance with Alg y are transmitted along a route that includes network node N4, and not network node N1.

Figure 1C:
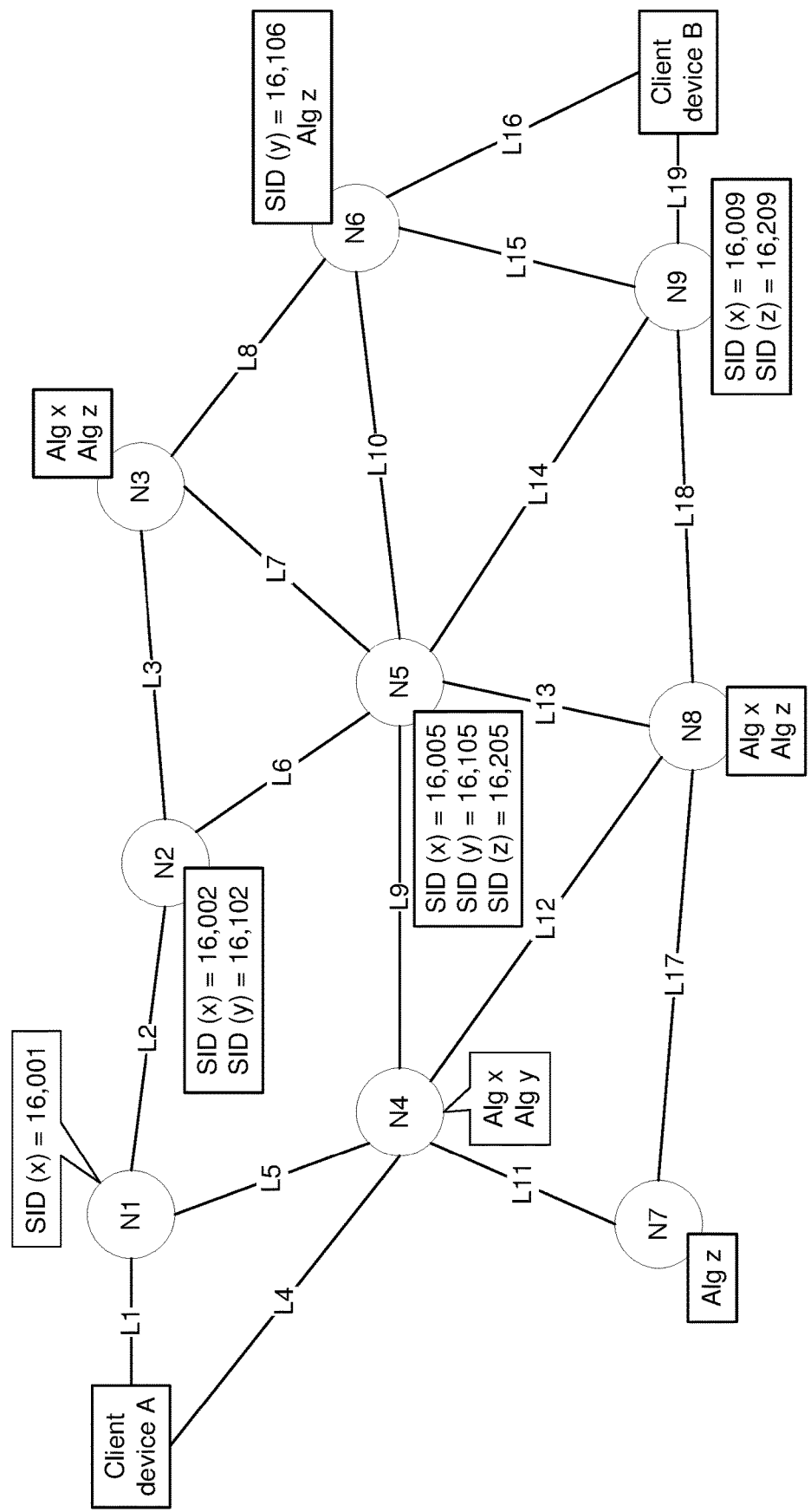

Referring to FIG. 1C, in some implementations, some network nodes indicate (e.g., advertise, broadcast and/or publish) the routing criteria that the network nodes support. In some implementations, the network nodes indicate their support for a particular routing criterion via a router capability (RC). In some implementations, the network nodes are associated with a respective set of router capabilities. In some implementations, a network node utilizes a first router capability to indicate the definition of a routing criterion, a second router capability to indicate whether or not the network node supports the routing criterion, and a third router capability to indicate a segment identifier (SID) that is associated with the routing criterion. In the example of FIG. 1C, a router capability of network node N1 indicates that the SID for Alg x is 16,001. In the example of FIG. 1C, a router capability of network node N2 indicates that the SID for Alg x is 16,002 and the SID for Alg y is 16,102. In the example of FIG. 1C, a router capability of network node N5 indicates that the SID for Alg x is 16,005, the SID for Alg y is 16,105 and the SID for Alg z is 16,205. In the example of FIG. 1C, a router capability of network node N9 indicates that the SID for Alg x is 16,009 and the SID for Alg z is 16,209. In some implementations, some network nodes do not advertise the routing criteria that the network nodes support. In some implementations, some network nodes are not associated with SIDs. For example, in FIG. 1C, network nodes N3, N4, N7 and N8 are associated with any SIDs. In some implementations, some network nodes have SIDs for some routing criteria while not for other routing criteria. For example, in FIG. 1C, the network node N6 has an SID for Alg y but the network node N6 does not have an SID for Alg z.

Figure 1D:
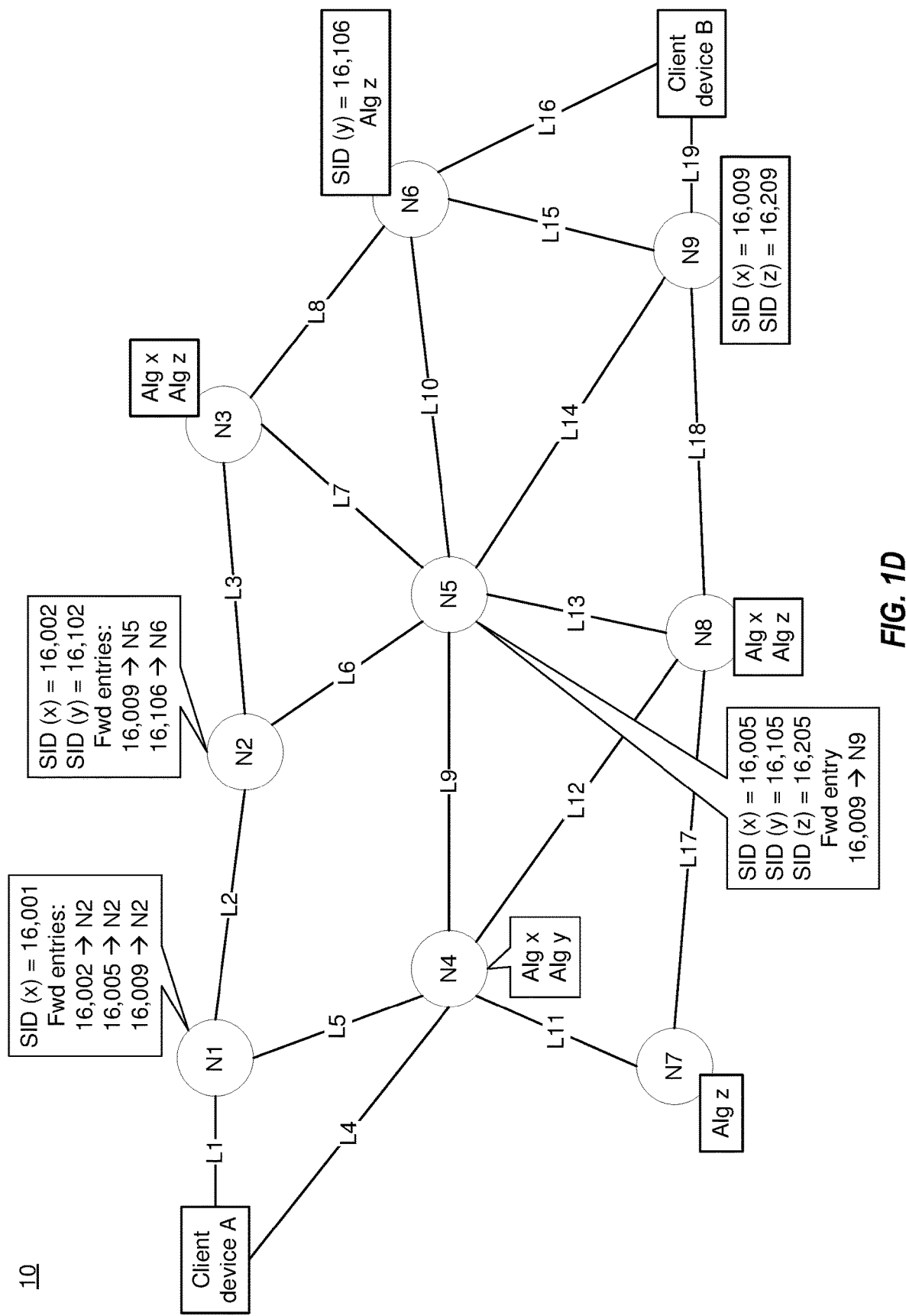

Referring to FIG. 1D, in various implementations, the network nodes N1 . . . N9 install configuration information that allows the network nodes N1 . . . N9 to direct (e.g., propagate or transmit) data packets in accordance with different routing criteria. In some implementations, the configuration information includes forwarding entries that indicate downstream network nodes that support the routing criterion being used to transmit data packets. In some implementations, the forwarding entries include a mapping of SIDs to downstream network nodes that are associated with the SIDs. In the example of FIG. 1D, the network node N1 includes forwarding entries that map SIDs 16,002, 16,005 and 16,009 to the network node N2. As such, the network node N1 transmits any data packets that are labeled with SID 16,002, 16,005 or 16,009 to the network node N2. In the example of FIG. 1D, the network node N2 includes forwarding entries that map SID 16,009 to network node N3, and SID 16,106 to network node N6. As such, the network node N2 transmits any data packets that are labeled with SID 16,009 to network node N3, and any data packets that are labeled with SID 16,106 to network node N6. In the example of FIG. 1D, the network node N5 includes forwarding entries that map SID 16,009 to network node N9. As such, the network node N5 transmits any data packets that are labeled with SID 16,009 to network node N9.

In some implementations, the forwarding entries (e.g., the configuration information) are installed at the network nodes in response to the network nodes being on a route that is being used to transport data packets. In some implementations, the forwarding entries are installed at the network nodes by a controller (e.g., the network controller 20 shown in FIG. 1A). For example, in some implementations, the controller pushes the forwarding entries to the network nodes after determining that the network nodes are on a selected route for transporting data packets. In some implementations, the forwarding entries are installed on the network nodes that are on the route, and not on the network nodes that are not on the route. More generally, in various implementations, network nodes that are on a route for transporting a set of data packets are configured with configuration information.

In various implementations, the configuration information is updated when data packets are transmitted using a different routing criterion. For example, in some implementations, different forwarding entries are installed when data packets are transmitted using different routing algorithms More generally, in various implementations, the configuration information (e.g., the forwarding entries) are based on the routing criterion (e.g., the routing algorithm) that is being used to transport the data packets. Updating the configuration information (e.g., updating the forwarding entries) allows more flexibility in transporting data packets using different routing criteria (e.g., different routing algorithms) For example, with reference to FIG. 1D, updating the forwarding entries enables transporting a first set of data packets in accordance with Alg x, a second set of data packets in accordance with Alg y, and a third set of data packets in accordance with Alg z.

Figure 1E:
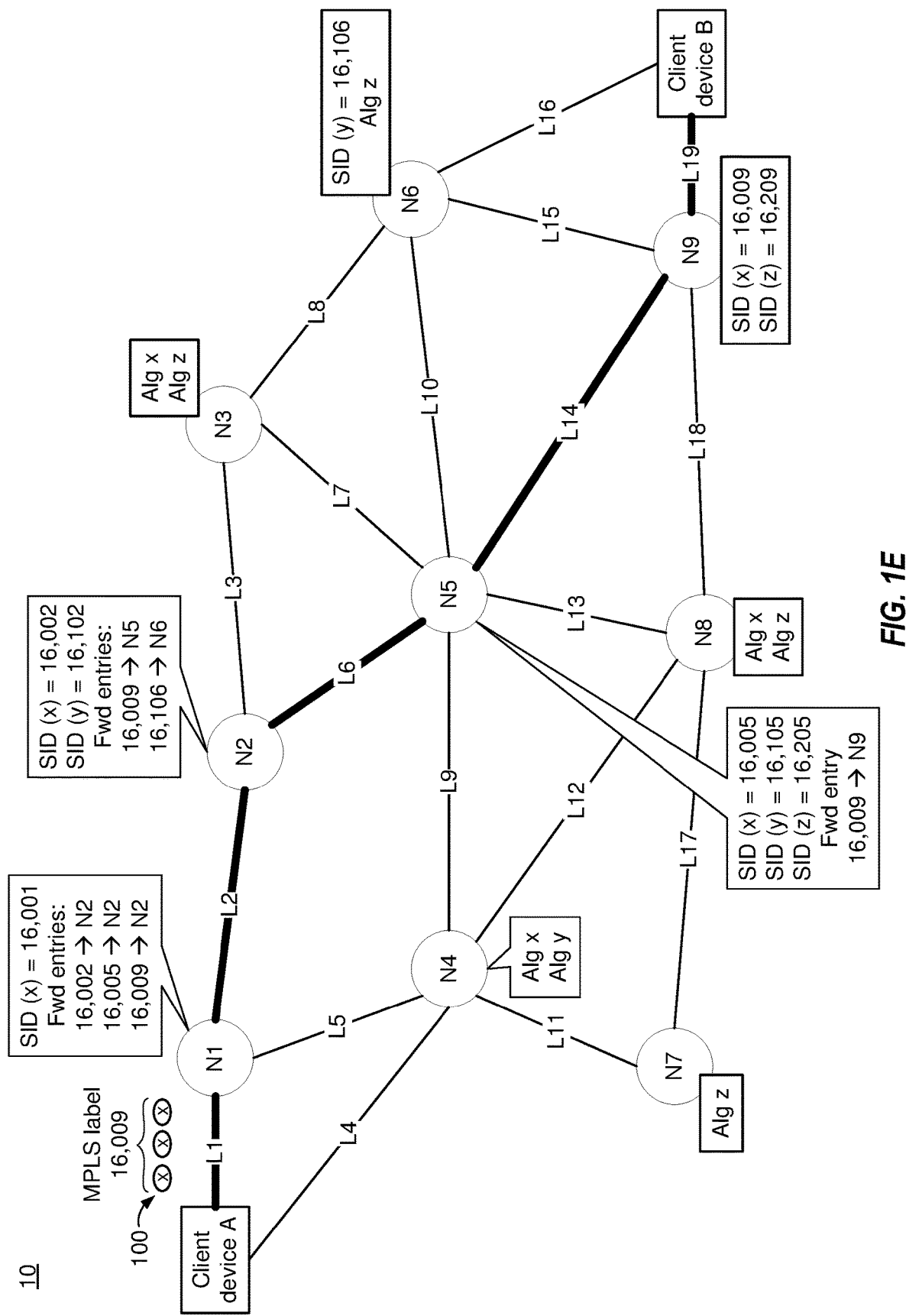

Referring to FIG. 1E, the network obtains a request to transmit a set of data packets 100 from client device A to client device B. In the example of FIG. 1E, the set of data packets are labeled with a MPLS (multiprotocol label switching) label of 16,009. The MPLS label of 16,009 indicates that the set of data packets are to be transmitted in accordance with Alg x because 16,009 is the SID for Alg x at network node N9. More generally, in various implementations, the set of data packets 100 indicates a routing criterion that is to be used to transport the set of data packets 100. In some implementations, the MPLS label is applied to the set of data packets 100 by the network node N1, the network controller 20 shown in FIG. 1A and/or the client device A.

FIG. 1E illustrates a route which includes network nodes that support Alg x—the routing criterion that is to be used to transport the set of data packets 100. As illustrated in FIG. 1E, the route includes network nodes N1, N2, N5 and N9, and communication links L1, L2, L6, L14 and L19. In operation, the network node N1 receives the set of data packets 100. Since the set of data packets 100 are labeled with 16,009, in accordance with the forwarding entries installed at network node N1, network node N1 forwards the set of data packets 100 to network node N2. Network node N2 receives the set of data packets 100 from network node N1 over the communication link L2. Since the set of data packets 100 are labeled with 16,009, in accordance with the forwarding entries installed at network node N2, network node N2 forwards the set of data packets 100 to network node N5. Network node N5 receives the set of data packets 100 from network node N2 over the communication link L6. Since the set of data packets 100 are labeled with 16,009, in accordance with the forwarding entries installed at network node N5, network node N5 forwards the set of data packets 100 to network node N9. Network node N9 receives the set of data packets 100 from network node N5 over the communication link L14. Network node N9 forwards the set of data packets 100 to the client device B over the communication link L19.

In the example of FIG. 1E, the network nodes N1, N2, N5 and N9 on the route satisfy the routing criterion associated with the set of data packets 100. For example, the network nodes N1, N2, N5 and N9 support Alg x. Network nodes that do not support the routing criterion associated with the set of data packets 100 are not included in the route. For example, network nodes N7 and N6 are not included in the route. In some implementations, a controller (e.g., the network controller 20 shown in FIG. 1A) identifies all network nodes that support the routing criterion associated with the set of data packets 100. For example, the controller identifies that network nodes N1, N2, N3, N4, N5, N8 and N9 support Alg x. In some implementations, the controller determines the shortest/fastest route through the network nodes that support the routing criterion associated with the set of data packets 100. In the example of FIG. 1E, the shortest/fastest route includes network nodes N1, N2, N5 and N9.

Figure 1F:
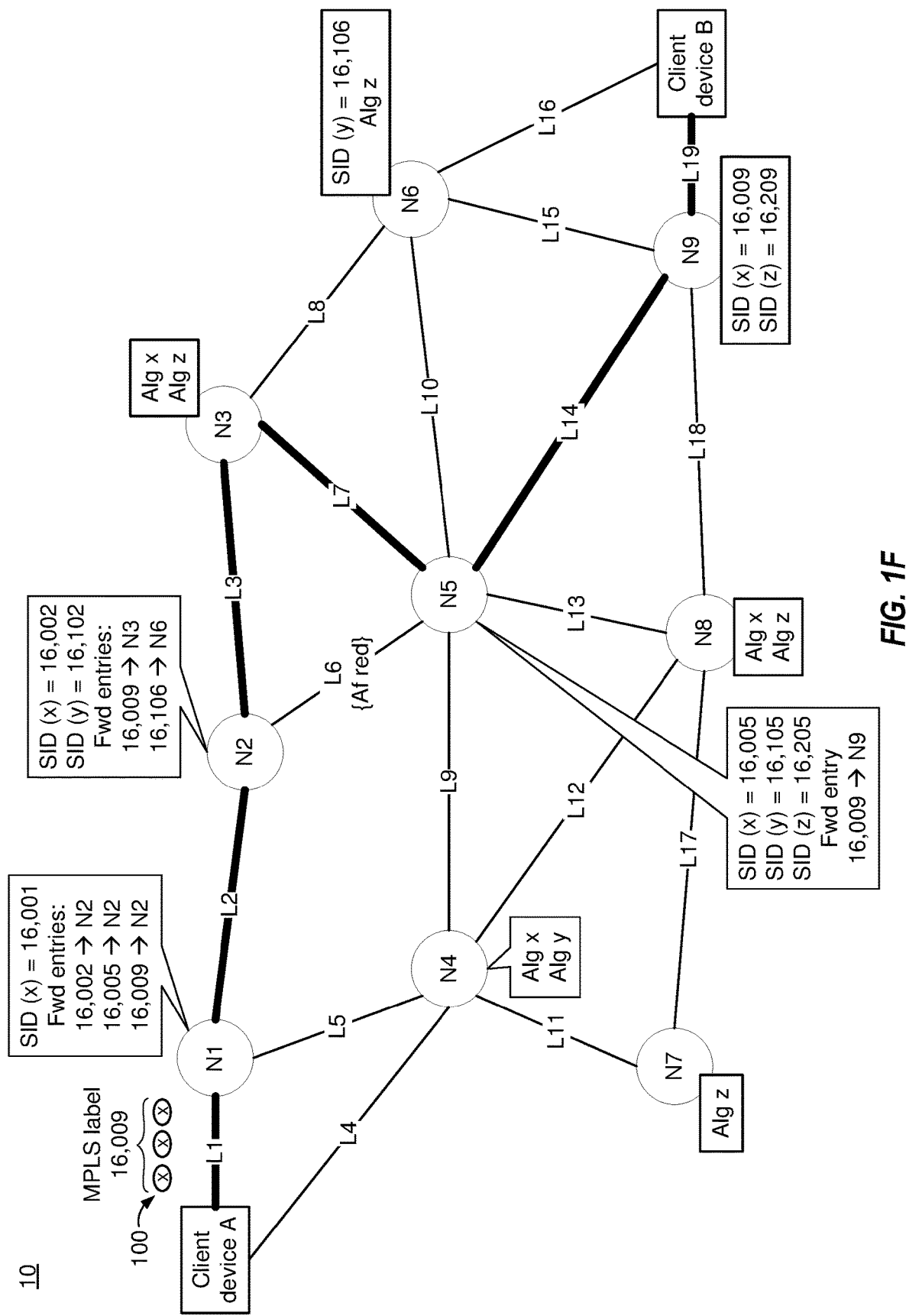

Referring to FIG. 1F, in various implementations, the routing criterion indicates one or more restrictions (e.g., exclusionary constraints). In some implementations, the exclusionary constraints indicate characteristics of network nodes and/or communication links that are to be avoided. In such implementations, the determined route does not include network nodes and/or communication links with characteristics that match the exclusionary constraints. In the example of FIG. 1F, the communication link L6 is associated with affinity red. Moreover, in the example of FIG. 1F, one of the exclusionary constraints associated with the routing criterion (e.g., with Alg x) is to avoid communication links with affinity red. As such, in the example of FIG. 1F, the route does not include communication link L6. Instead of communication link L6, the route in the example of FIG. 1F includes communication links L3 and L7.

In various implementations, the routing criterion for the set of data packets 100 is determined based on a type of the data packets 100. For example, in some implementations, if the set of data packets 100 correspond to streaming video, then the routing criterion for the set of data packets 100 is set to Alg x. In some implementations, if the set of data packets 100 correspond to messaging, then the routing criterion for the set of data packets 100 is set to Alg y. In some implementations, if the set of data packets 100 correspond to encrypted traffic, then the routing criterion for the set of data packets 100 is set to Alg z. In some implementations, the routing criterion for the set of data packets 100 is set by the client device A. In some implementations, the routing criterion for the set of data packets 100 is set by network node N1. In some implementations, the routing criterion for the set of data packets 100 is set by a controller (e.g., by the network controller 20 shown in FIG. 1A).

In the example of FIG. 1A, the network controller 20 is shown as being separate from the network nodes N1 . . . N9. However, in some implementations, the network controller 20 resides at one or more of the network nodes N1 . . . N9. In some implementations, the network controller 20 is distributed across various computing devices. For example, in some implementations, the network controller 20 is implemented by a cloud computing system. In the example of FIG. 1A, a single instance of the network controller 20 is shown. However, in some implementations, there are multiple instances of the network controller 20. For example, in some implementations, different network controllers control different parts of the network. In some implementations, the network nodes N1 . . . N9 are controlled by different network operating entities. In such implementations, each network operating entity utilizes a network controller to control its network nodes.

Figure 2A:
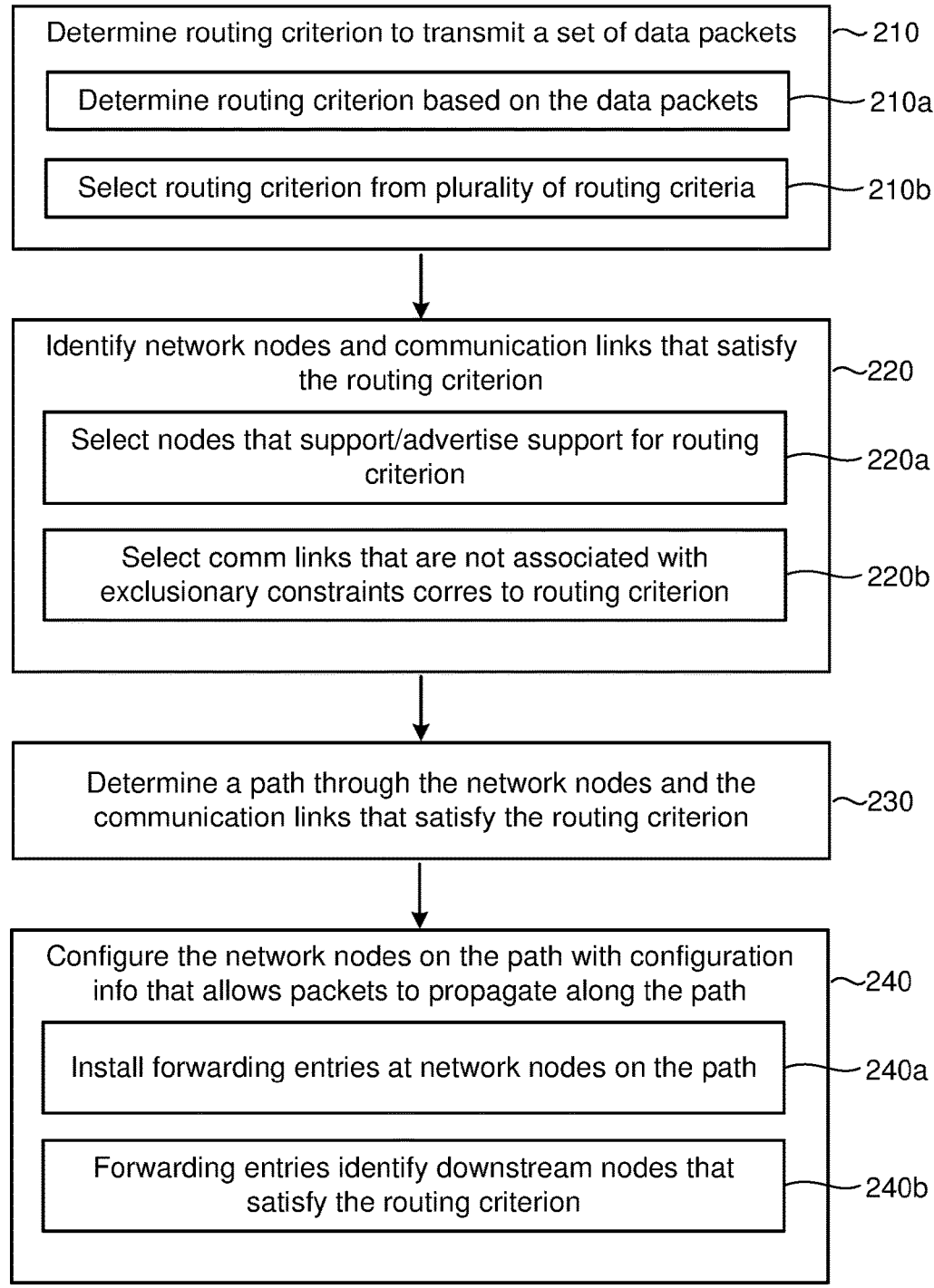
FIG. 2A is a flowchart representation of a method of configuring network nodes in a network in accordance with some implementations.

FIG. 2A is a flowchart representation of a method 200 of configuring network nodes (e.g., the network nodes N1 . . . N9 shown in FIGS. 1A-1F) in a network in accordance with some implementations. In various implementations, the method 200 is implemented as a set of computer readable instructions that are executed at a device (e.g., the network controller 20 shown in FIG. 1A, one or more of the network nodes N1 . . . N9 shown in FIGS. 1A-1F and/or the device 300 shown in FIG. 3). Briefly, the method 200 includes determining a routing criterion to transmit a set of data packets (210), identifying network nodes and communication links that satisfy the routing criterion (220), determining a route for the set of data packets through the network nodes and the communication links that satisfy the routing criterion (230), and configuring the network nodes that are on the route with configuration information that allows the set of data packets to propagate along the route (240).

As represented by block 210, in various implementations, the method 200 includes determining a routing criterion to transmit a set of data packets across a network. For example, in some implementations, the method 200 includes determining a routing algorithm to transmit the set of data packets across a set of interconnected network nodes. As represented by block 210a, in some implementations, the method 200 includes determining the routing criterion based on the set of data packets. In some implementations, the method 200 includes determining the routing criterion based on a type of the set of data packets. For example, in some implementations, the type indicates whether the set of data packets carry messaging data (e.g., messages from an instant messaging application), media data (e.g., videos, music, etc.), voice data, file transfer data, streaming data (e.g., video streaming data, audio streaming data, etc.), and/or encrypted data. In some implementations, the method 200 includes selecting a first routing criterion for data packets that correspond to video streaming, selecting a second routing criterion for data packets that correspond to messaging, and selecting a third routing criterion for data packets that correspond to all other types of traffic. As represented by block 210b, in some implementations, the method 200 includes selecting the routing criterion from a plurality of routing criteria. In some implementations, the method 200 includes determining the routing criterion by selecting an existing routing criterion. In some implementations, the method 200 includes determining the routing criterion by modifying an existing routing criterion. In some implementations, the method 200 includes determining the routing criterion by creating a new routing criterion.

In some implementations, the set of data packets are associated with a transmission priority value (e.g., '1' for high priority, '0' for medium priority and '−1' for low priority). In such implementations, the method 200 includes determining the routing criterion for the set of data packets based on the transmission priority value. For example, in such implementations, the method 200 includes selecting a first routing criterion (e.g., Alg x shown in FIG. 1B) for data packets with a transmission priority value of '1', a second routing criterion (e.g., Alg y shown in FIG. 1B) for data packets with a transmission priority value of '0', and a third routing criterion (e.g., Alg z shown in FIG. 1B) for data packets with a transmission priority value of '−1'.

In some implementations, the method 200 includes determining the routing criterion based on a target metric associated with the set of data packets. In some implementations, the target metric includes an Interior Gateway Protocol (IGP) metric. In some implementations, the network nodes and/or the communication links are configured to control (e.g., maintain, reduce or increase) the IGP metric. In some implementations, the target metric relates to affinity values. For example, in some implementations, the target metric is to exclude predefined affinity values (e.g., exclude Traffic Engineering (TE) affinity 2, exclude TE affinity 1, etc.). In some implementations, the target metric relates to color values. For example, in some implementations, the target metric specifies specific color values (e.g., Color 1, Color 2, etc.).

As represented by block 220, in various implementations, the method 200 includes identifying network nodes and communication links in the network that satisfy the routing criterion. As represented by block 220a, in some implementations, the method 200 includes selecting nodes that support and/or advertise support for the routing criterion for the set of data packets. In some implementations, the method 200 includes selecting network nodes that support the routing criterion regardless of whether the network nodes advertise support for the routing criterion. In some implementations, the method 200 includes selecting network nodes that support the routing criterion and advertise support for the routing criterion (e.g., the network nodes indicate that they support the routing criterion).

As represented by block 220b, in some implementations, the method 200 includes selecting network nodes and/or communication links that are not associated with exclusionary constraints corresponding to the routing criterion. In some implementations, the routing criterion indicates one or more exclusionary constraints (e.g., characteristics of network nodes and/or communication links that are to be avoided). In such implementations, the method 200 includes forgoing selecting network nodes and/or communication links with characteristics that are among the exclusionary constraints.

As represented by block 230, in some implementations, the method 200 includes determining a route through the network nodes and the communication links that satisfy the routing criterion. In some implementations, the method 200 includes determining the shortest route through the network nodes and the communication links that satisfy the routing criterion. In some implementations, the method 200 includes determining the fastest route through the network nodes and the communication links that satisfy the routing criterion.

In some implementations, the method 200 includes determining the route based on a target metric associated with the set of data packets. In various implementations, the network nodes are associated with respective target metrics. For example, in some implementations, the network nodes are configured to control (e.g., maintain, reduce or increase) their respective target metrics. In such implementations, the method 200 includes determining the route by selecting network nodes that are configured to control the target metric associated with the set of data packets. In some implementations, the target metric includes one or more of an Interior Gateway Protocol (IGP) metric, a Traffic Engineering (TE) metric, etc.

As represented by block 240, in various implementations, the method 200 includes configuring the network nodes that are on the route with configuration information that allows the set of data packets to propagate along the route. As represented by block 240a, in some implementations, the method 400 includes installing forwarding entries at the network nodes that are on the route. In some implementations, the method 200 includes pushing, by a controller (e.g., the network controller 20 shown in FIG. 1A) the forwarding entries to the network nodes that are on the route. In some implementations, the method 200 includes fetching, by the network nodes that are on the route, the forwarding entries. As represented by block 240b, in some implementations, the forwarding entries identify downstream nodes that satisfy the routing criterion. For example, in some implementations, the forwarding entries map SIDs to corresponding network nodes (e.g., Internet Protocol (IP) addresses of corresponding network nodes).

Figure 2B:
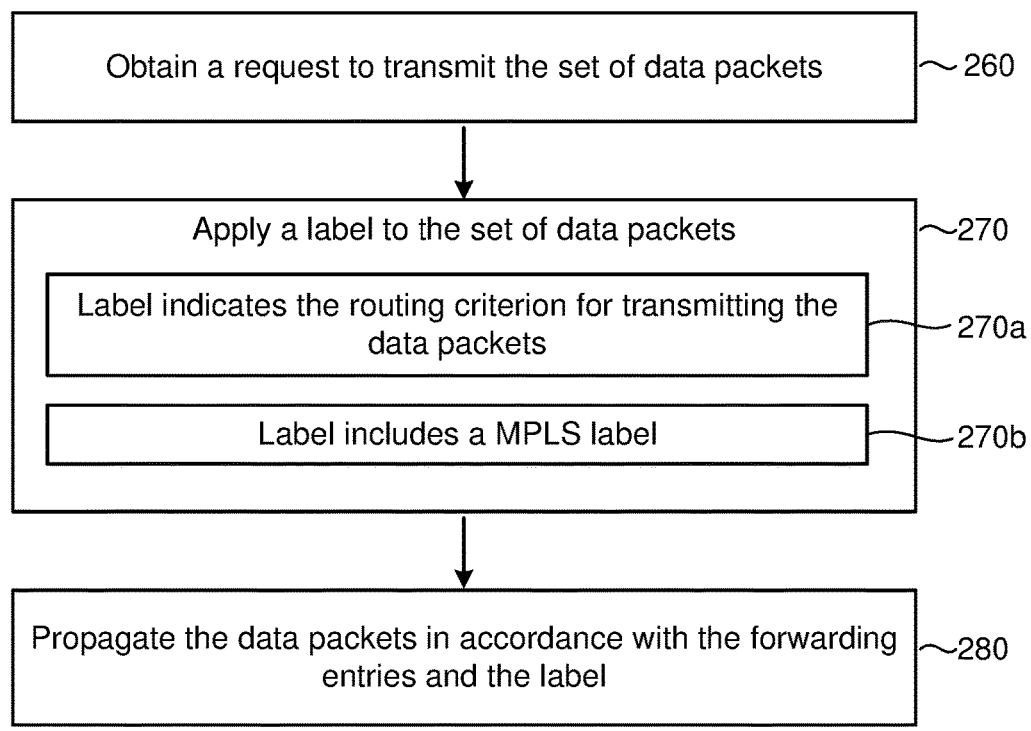
FIG. 2B is a flowchart representation of a method of propagating data packets in accordance with some implementations.

FIG. 2B is a flowchart representation of a method 250 of propagating data packets in accordance with some implementations. In various implementations, the method 250 is implemented as a set of computer readable instructions that are executed at a device (e.g., the network controller 20 shown in FIG. 1A, one or more of the network nodes N1 . . . N9 shown in FIGS. 1A-1F and/or the device 300 shown in FIG. 3). Briefly, the method 250 includes obtaining a request to transmit a set of data packets (260), applying a label to the set of data packets (270), and propagating the data packets in accordance with forwarding entries and the label (280).

As represented by block 260, in various implementations, the method 250 includes obtaining a request to transmit the set of data packets (e.g., the set of data packets 100 shown in FIG. 1E). In some implementations, the method 250 includes receiving the request from a client device (e.g., the client device A shown in FIGS. 1A-1F). In some implementations, the method 250 includes receiving the request at a network node that is at an edge of the network (e.g., at an edge node, for example, at network node N1 shown in FIGS. 1A-1F). In some implementations, the method 250 includes receiving the request at a controller (e.g., the network controller 20 shown in FIG. 1A).

As represented by block 270, in various implementations, the method 250 includes applying a label to the set of data packets. As represented by block 270a, in some implementations, the label indicates a routing criterion for transmitting the data packets. To that end, in some implementations, the method 250 includes determining the routing criterion for transmitting the data packets. For example, in some implementations, the method 250 includes determining the routing criterion based on the set of data packets. In some implementations, the method 250 includes selecting an existing routing criterion, modifying an existing routing criterion or creating a new routing criterion based on a type of the set of data packets. In some implementations, the method 250 includes determining the routing criterion based on the request (e.g., by retrieving the routing criterion from the request). As represented by block 270b, in some implementations, the method 250 includes applying a MPLS label to the set of data packets. For example, in some implementations, the method 250 includes inserting the label in respective header fields of the data packets.

As represented by block 280, in various implementations, the method 250 includes propagating the data packets in accordance with configuration information of the network nodes and the label. In some implementations, the method 250 includes forwarding the data packets in accordance with forwarding entries and the label affixed to the set of data packets. For example, in some implementations, the method 250 includes forwarding the data packets to the network node that is mapped to the label.

In various implementations, the method 200 and/or the method 250 allow routing of data packets even though the network nodes and the communication links have different routing capabilities. In some implementations, the method 200 allows the network nodes and the communication links to support different routing criteria thereby providing more flexibility. For example, in some implementations, the method 200 allows the network nodes and/or the communication links to support different routing algorithms. Advantageously, the method 200 enables malleable routing for data packets by allowing the network nodes and/or the communication links to change their respective routing capabilities (e.g., by supporting different routing criteria).

Figure 3:
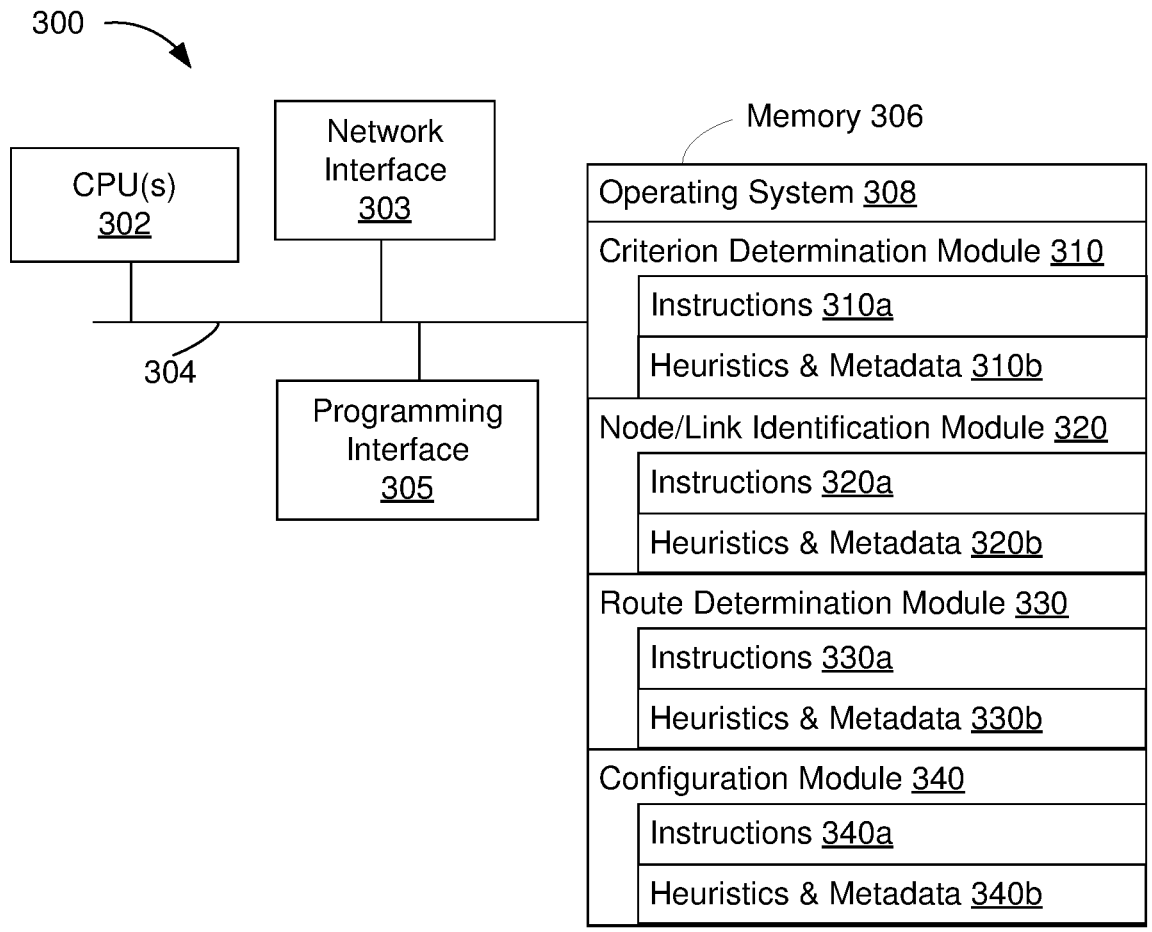
FIG. 3 is a block diagram of a device enabled with various modules that are provided to configure network nodes and propagate data packets in accordance with some implementations.

FIG. 3 is a block diagram of a device 300 enabled with one or more components of a device (e.g., the network controller 20 shown in FIG. 1A, and/or one or more of the network nodes N1 . . . N9 shown in FIGS. 1A-1F) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 300 includes one or more processing units (CPUs) 302, a network interface 303, a programming interface 305, a memory 306, and one or more communication buses 304 for interconnecting these and various other components.

In some implementations, the network interface 303 is provided to, among other uses, establish and maintain a metadata tunnel between a cloud hosted network management system and at least one private network including one or more compliant devices. In some implementations, the communication buses 304 include circuitry that interconnects and controls communications between system components. The memory 306 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 306 optionally includes one or more storage devices remotely located from the CPU(s) 302. The memory 306 comprises a non-transitory computer readable storage medium.

In some implementations, the memory 306 or the non-transitory computer readable storage medium of the memory 306 stores the following programs, modules and data structures, or a subset thereof including an optional operating system 308, a routing criterion determination module 310, a node/link identification module 320, a route determination module 330, and a configuration module 340. In various implementations, the routing criterion determination module 310 determines a routing criterion that is to be used to transmit a set of data packets across a network. To that end, the routing criterion determination module 310 includes instructions 310a, and heuristics and metadata 310b. In various implementations, the node/link identification module 320 identifies network nodes and communication links in the network that satisfy the routing criterion. To that end, the node/link identification module 320 includes instructions 320a, and heuristics and metadata 320b. In various implementations, the route determination module 330 determines a route for the set of data packets through the network nodes and the communication links that satisfy the routing criterion. To that end, the route determination module 330 includes instructions 330a, and heuristics and metadata 330b. In various implementations, the configuration module 340 configures the network nodes that are on the route with configuration information that allows the set of data packets to propagate along the route. To that end, the configuration module 340 includes instructions 340a, and heuristics and metadata 340b.

In some implementations, the method 200, the method 250 and/or the device 300 enable a routing criterion (e.g., a routing algorithm, for example, an IGP prefix SID algorithm) to be defined on a per-deployment basis. For example, in some implementations, a flexible algorithm K is defined as controlling (e.g., reducing, for example, minimizing) a particular target metric (e.g., an IGP metric, a TE metric, or other network performance metrics such as latency). In some implementations, the flexible algorithm K further defines a set of one or more restrictions (e.g., exclusionary constraints or excluded resources). In some implementations, the set of restrictions are identified by their Shared Risk Link Groups (SRLG), TE affinity and/or Internet Protocol (IP) address.

In various implementations, the method 200, the method 250 and/or the device 300 allow different operators to define different routing criterion (e.g., different routing algorithms). For example, in some implementations, an operator K that controls one or more network nodes defines a first routing criterion as controlling an IGP metric (e.g., reducing the IGP metric, for example, minimizing the IGP metric) and avoiding a particular SRLG (e.g., avoiding SRLG1). In some implementations, an operator J that controls one or more network nodes defines a second routing criterion as controlling a TE metric (e.g., reducing the TE metric, for example, minimizing the TE metric) and avoiding TE affinity 1.

In various implementations, the method 200, the method 250 and/or the device 300 enable support for different routing criteria. For example, in some implementations, the method 200, the method 250 and/or the device 300 enable support for a routing criterion (e.g., ALG 11) that controls an IGP metric (e.g., reduces the IGP metric, for example, minimizes the IGP metric) and excludes TE affinity 2. In some implementations, the method 200, the method 250 and/or the device 300 enable support for another routing criterion (e.g., ALG 12) that controls the IGP metric and excludes TE affinity 1. In some implementations, a set of Table, Length and Value (TLVs) are utilized to encode the defining characteristics of a routing criterion. In various implementations, the method 200, the method 250 and/or the device 300 allow network-wide automation of the assignment/modification of the routing criteria.

In various implementations, the method 200, the method 250 and/or the device 300 allow network nodes to indicate (e.g., advertise, for example, broadcast) the definition of their respective routing criterion. For example, in some implementations, the device 300 advertises the example routing criteria ALG11 and ALG 12 as:

ALG11=control (e.g., reduce, for example, minimize) IGP metric, exclude TE affinity 2, Color 1

ALG12=control (e.g., reduce, for example, minimize) IGP metric, exclude TE affinity 1, Color 2

In some implementations, the device 300 (e.g., the node/link identification module 320 and/or the route determination module 330) detects inconsistencies between network nodes that support the same routing criterion.

In some implementations, the router capability (RC) of network nodes indicates the definition of the routing criteria supported by the network nodes. For example, in some implementations, the router capability of network nodes M and N indicates that the network nodes M and N support ALG11:

RC of network node M indicates ALG 11=control IGP metric, exclude TE affinity 2

RC of network node N indicates ALG 11=control IGP metric, exclude TE affinity 2

Since network nodes M and N indicate the same definition for ALG 11, the device 300 (e.g., the node/link identification module 320 and/or the route determination module 330) determines that the definition of the routing criterion supported by the network nodes M and N is consistent. In some implementations, the network nodes utilize a new RC TLV to indicate the definition of the routing criterion that the network nodes support.

In various implementations, the device 300 determines whether a network node N is enabled for (e.g., supports) a particular routing criterion (e.g., ALG(K)). If the device 300 determines that the network node N does not support ALG (K), the device 300 does not include the network node N in the route. For example, in some implementations, the network node N does not compute ALG(K) Dijkstra and does not install ALG(K) prefix SID. If the device 300 determines that the network node N supports ALG(K), the device 300 prunes all the nodes that do not support ALG(K), prunes all the communication links falling under the exclude constraints defined for ALG(K), computes Dijkstra on the resulting topology according to the target metric associated with ALG(K), and installs the prefix SID according to the computed Dijkstra shortest route for any prefix leaf with an ALG(K) prefix SID.

In various implementations, the device 300 determines a backup route (e.g., a secondary route, for example, a Fast Reroute (FRR) backup route). In some implementations, the backup route is associated with (e.g., respects) the same characteristics (e.g., constraints) as the route (e.g., the primary route). For example, in some implementations, the backup route is determined based on the same routing criterion as the primary route. In some implementations, to determine (e.g., compute) the backup route for the Prefix SID S of ALG(K), the device 300 executes a Topology-Independent Loop-Free Alternate (TI-LFA) algorithm on the topology T'(K), where T'(K) is T(K) minus the resource protected with TILFA (e.g., link, node, SRLG). In some implementations, the post-convergence backup route is encoded with SIDs associated with ALG(K).

In some implementations, the device 300 provides automated steering of service traffic on the IGP prefix SID with the routing criterion implementing the service level agreement (SLA) associated with (e.g., required by) the service route. In some implementations, when a provider edge (PE) receives a Border Gateway Protocol (BGP)/Service route R via N with Color Extended Community C, the PE installs R via S, where S is the Prefix SID of N for Alg(K) mapped to C. In such implementations, there is automated steering of BGP/Service routes onto prefix SIDs associated with the routing criterion. The following is a non-limiting example of automated steering of BGP/Service routes:

PE receives BGP route 1/8 via 2.2.2.2 with color 1

2.2.2.2 is advertised in IGP with Prefix SID 17002 for a particular routing criterion (e.g., ALG 11)

ALG 11 is defined by Mapping Server as "IGP metric, exclude TE-affinity2, color 1"

In the above example, PE installs 1/8 via 17002 because 17002 is the Prefix SID of 2.2.2.2 according to ALG 11. In the above example, ALG 11 is bound to color 1.

In some implementations, a single SID is utilized to encode the shortest route instead of N SIDs. In some implementations, the device 300 encodes the shortest-route as a list of N SIDs of algorithm zero. In some implementations, the SID list size is the primary data plane constraint for a segment route (SR) deployment.

In some implementations, the device 300 enables flexible and customized configuration of the network nodes and/or the communication links. In some implementations, the device 300 supports dual-plane policies. In some implementations, the device 300 encodes planes differently (e.g., any TE affinity value can be used, and/or any SRLG value can be used). In various implementations, the device 300 enables network operators, network nodes and/or communication links to define their own routing criterion.

In some implementations, the device 300 enables network-wide automation of adopting/modifying routing criteria. In some implementations, a mapping server extension is defined to distribute the definition of routing criteria (e.g., an IGP algorithm) across all the network nodes of the domain/area. In some implementations, the device 300 detects inconsistent definitions of a routing criterion. In some implementations, a router capability extension is defined to indicate (e.g., advertise) the definition of a routing criterion for the network nodes. In some implementations, if network nodes supporting the same routing criterion do not indicate the same definition for the routing criterion, the device 300 detects an inconsistency. In some implementations, the device 300 enables automated steering of service flows onto the prefix SID associated with the routing criterion. In some implementations, the device 300 determines a backup route that is associated with (e.g., follows or respects) the same constraints as the primary route.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   determining routing criteria to transmit a set of data packets across a network, wherein determining the routing criteria comprises determining the routing criteria based on metadata associated with the set of data packets, and wherein determining the routing criteria based on the metadata associated with the set of data packets comprises:
      determining a first routing criterion for a first set of data packets of the set of data packets associated with a first metadata, wherein the first routing criterion comprises a constraint to be used and an exclusionary constraint for routing the first set of data packets, wherein the constraint to be used comprises a first characteristic of network nodes and communication links to be used for routing the first set of data packets, and wherein the exclusionary constraint comprises a second characteristic of network nodes and communication links to be avoided for routing the first set of data packets;
   identifying first network nodes and first communication links in the network that satisfy the first routing criterion, wherein identifying the first network nodes and the first communication links that satisfy the first routing criterion comprises:
      selecting all network nodes and communication links of the network that support and advertise the first characteristic of network nodes and communication links to be used for routing the first set of data packets, and
      forgoing selection of one or more network nodes and communication links of the all network nodes and communication links that support and advertise the second characteristic of network nodes and communication links to be avoided for routing the first set of data packets;
   determining a first path for the first set of data packets through the first network nodes and the first communication links that satisfy the first routing criterion; and
   configuring the first network nodes that are on the first path with configuration information that allows the first set of data packets to propagate along the first path, wherein configuring the first network nodes that are on the first path with configuration information comprises installing first forwarding entries that identify downstream network nodes that support the first routing criteria.

2. The method of claim 1, wherein identifying the first network nodes that satisfy the first routing criterion further comprises:
   forgoing selection of network nodes that do not support the first routing criterion or do not advertise support for the first routing criterion.

3. The method of claim 1, further comprising:
   obtaining a request to transmit the set of data packets from a first client device to a second client device.

4. The method of claim 1, further comprising:
   applying a label to a header of the first set of data packets to indicate that the first set of data packets are to be transmitted across the network in accordance with the first routing criterion.

5. The method of claim 1, further comprising:
   identifying second network nodes and second communication links in the network that satisfy a second routing criterion, wherein identifying the second network nodes and the second communication links that satisfy the second routing criterion comprises selecting network nodes and communication links of the network that support the second routing criterion;
   determining a second path for the second set of data packets through the second network nodes and the second communication links that satisfy the second routing criterion; and
   configuring the second network nodes that are on the second path with configuration information that allows the second set of data packets to propagate along the second path.

6. The method of claim 1, wherein the first metadata is associated with a first type of data packets and a second metadata is associated with a second type of data packets.

7. The method of claim 1, wherein the first metadata is associated with a first priority and a second metadata is associated with a second priority.

8. The method of claim 1, wherein the first metadata comprises a first segment identifier associated with a first type of data packets and a second metadata comprises a second segment identifier associated with a second type of packets.

9. The method of claim 1, wherein the first metadata is associated with a first target metric and a second metadata is associated with a second target metric, wherein the first target metric and the second target metric comprises an interior gateway protocol metric.

10. An electronic device, comprising:
a memory; and
one or more processors connected to the memory, wherein the one or more processors are operative to:
determine routing criteria to transmit a set of data packets across a network, wherein the one or more processors being operative to determine the routing criteria comprises the one or more processors being operative to determine the routing criteria based on metadata associated with the set of data packets, and wherein the one or more processors being operative to determine the routing criteria based on the metadata associated with the set of data packets comprises the one or more processors being operative to:
determine a first routing criterion for a first set of data packets of the set of data packets associated with a first metadata, wherein the first routing criterion comprises a constraint to be used and an exclusionary constraint for routing the first set of data packets, wherein the constraint to be used comprises a first characteristic of network nodes and communication links to be used for routing the first set of data packets, and wherein the exclusionary constraint comprises a second characteristic of network nodes and communication links to be avoided for routing the first set of data packets;
identify first network nodes and first communication links in the network that satisfy the first routing criterion, wherein the one or more processors being operative to identify the first network nodes and the first communication links that satisfy the first routing criterion comprises the one or more processors being operative to:
select all network nodes and communication links of the network that support the first characteristic of network nodes and communication links to be used for routing the first set of data packets, and
forgo selection of one or more network nodes and communication links of the all network nodes and communication links that satisfy the second characteristic of network nodes and communication links to be avoided for routing the first set of data packets;
determine a first path for the first set of data packets through the first network nodes and the first communication links that satisfy the first routing criterion; and
configure the first network nodes that are on the first path with configuration information that allows the first set of data packets to propagate along the first path, wherein the one or more processors being operative to configure the first network nodes that are on the first path with configuration information comprises the one or more processors being operative to install first forwarding entries that identify downstream network nodes that support the first routing criteria.

11. The electronic device of claim 10, wherein the one or more processors being operative to identify the first network nodes that satisfy the first routing criterion comprises the one or more processors being further operative to:
forgo selection of network nodes that do not support the first routing criterion or do not advertise support for the first routing criterion.

12. The electronic device of claim 10, wherein the one or more processors are further operative to:
obtain a request to transmit the set of data packets from a first client device to a second client device.

13. The electronic device of claim 10, wherein the one or more processors are further operative to:
apply a label to the first set of data packets to indicate that the first set of data packets are to be transmitted across the network in accordance with the first routing criterion.

14. The system of claim 10, wherein the one or more processors being further operative to:
determine a second routing criterion for a second set of data packets of the set of data packets associated with a second metadata, wherein the second routing criterion is different from the first routing criterion, and wherein the second metadata is different from the first metadata.

15. The system of claim 14, wherein the one or more processors being further operative to:
identifying second network nodes and second communication links in the network that satisfy the second routing criterion, wherein identifying the second network nodes and the second communication links that satisfy the second routing criterion comprises selecting network nodes and communication links of the network that support the second routing criterion;
determining a second route for the second set of data packets through the second network nodes and the second communication links that satisfy the second routing criterion; and
configuring the second network nodes that are on the second path with configuration information that allows the second set of data packets to propagate along the second path.

16. The system of claim 14, wherein the first metadata is associated with a first type of data packets and the second metadata is associated with a second type of data packets.

17. A non-transitory computer readable storage medium storing instructions that, when executed perform a method comprising:
determining routing criteria to transmit a set of data packets across a network, wherein determining the routing criteria comprises determining the routing criteria based on metadata associated with the set of data packets, and wherein determining the routing criteria based on the metadata associated with the set of data packets comprises:
determining a first routing criterion for a first set of data packets of the set of data packets associated with a first metadata, wherein the first routing criterion comprises a constraint to be used and an exclusionary constraint for routing the first set of data packets, wherein the constraint to be used comprises a first characteristic of network nodes and communication links to be used for routing the first set of data packets, and wherein the exclusionary constraint comprises a second characteristic of network nodes and communication links to be avoided for routing the first set of data packets;

identifying first network nodes and first communication links in the network that satisfy the first routing criterion, wherein identifying the first network nodes and first communication links that satisfy the first routing criterion comprises:
  selecting all network nodes and communication links of the network that support and advertise the first characteristic of network nodes and communication links to be used for routing the first set of data packets, and
  forgoing selection of one or more network nodes and communication links of the all network nodes and communication links that support and advertise the second characteristic of network nodes and communication links to be avoided for routing the first set of data packets;
determining a first path for the first set of data packets through the first network nodes and the first communication links that satisfy the first routing criterion; and
configuring the first network nodes that are on the first path with configuration information that allows the first set of data packets to propagate along the first path, wherein configuring the first network nodes that are on the first path with configuration information comprises installing first forwarding entries that identify downstream network nodes that support the first routing criteria.

18. The non-transitory computer readable storage medium of claim 17, further comprising:
identifying second network nodes and second communication links in the network that satisfy a second routing criterion, wherein identifying the second network nodes and the second communication links that satisfy the second routing criterion comprises selecting network nodes and communication links of the network that support the second routing criterion;
determining a second route for the second set of data packets through the second network nodes and the second communication links that satisfy the second routing criterion; and
configuring the second network nodes that are on the second path with configuration information that allows the second set of data packets to propagate along the second path.

19. The non-transitory computer readable storage medium of claim 17, further comprising:
determining a second routing criterion for a second set of data packets of the set of data packets associated with a second metadata, wherein the second routing criterion is different from the first routing criterion, and wherein the second metadata is different from the first metadata.

20. The non-transitory computer readable storage medium of claim 19, wherein the first metadata is associated with a first type of data packets and the second metadata is associated with a second type of data packets.

* * * * *